(12) United States Patent
Leonard

(10) Patent No.: US 6,329,917 B1
(45) Date of Patent: Dec. 11, 2001

(54) IDENTIFICATION OR CONTROL ARRANGEMENTS

(76) Inventor: Philip Noel Leonard, Abbey House, Brockweir Chepstow, Gwent, NP6 7YY (GB)

( * ) Notice: Subject to any disclaimer, the term of this patent is extended or adjusted under 35 U.S.C. 154(b) by 0 days.

(21) Appl. No.: 09/355,256

(22) PCT Filed: Jan. 21, 1998

(86) PCT No.: PCT/GB98/00175
§ 371 Date: Jul. 23, 1999
§ 102(e) Date: Jul. 23, 1999

(87) PCT Pub. No.: WO98/33155
PCT Pub. Date: Jul. 30, 1998

(30) Foreign Application Priority Data

Jan. 25, 1997 (GB) .................................................... 9701555
Dec. 5, 1997 (GB) .................................................... 9725679

(51) Int. Cl.[7] .................................................... G08B 13/14
(52) U.S. Cl. ...................................... 340/572.8; 340/572.7
(58) Field of Search ............................. 340/572.1, 572.7, 340/572.8

(56) References Cited

U.S. PATENT DOCUMENTS 3,493,955 * 2/1970 Minasy ............................. 340/572.3
5,301,809 * 4/1994 Skinner ................................. 209/3.1
5,631,631 * 5/1997 Deschenes ......................... 340/572.1
5,896,087 * 4/1999 Frowein ............................ 340/572.1
6,025,781 * 2/2000 Deschenes ......................... 340/572.8
6,047,201 * 4/2000 Jackson, III ......................... 600/344
6,080,690 * 6/2000 Lebby et al. .......................... 442/209

FOREIGN PATENT DOCUMENTS 4341 880 * 6/1995 (DE) .
296 22 334 2/1997 (DE) .
8806 * 3/1980 (EP) .
04282 7/1987 (WO) .
17404 9/1993 (WO) .
29503 12/1994 (WO) .
0 712 102 5/1996 (WO) .

* cited by examiner

Primary Examiner—Thomas Mullen
(74) Attorney, Agent, or Firm—David P. Gordon; David S. Jacobson; Thomas A Gallagher

(57) ABSTRACT

A fibre or thread (20) incorporates an electronic transponder (10), which is of sufficiently small diameter that it is difficult or impossible to discern either visually or by touch. The transponder (10) can be interrogated to identify the fibre or thread or to identify a fabric or other article in which the fibre or thread is incorporated.

19 Claims, 2 Drawing Sheets

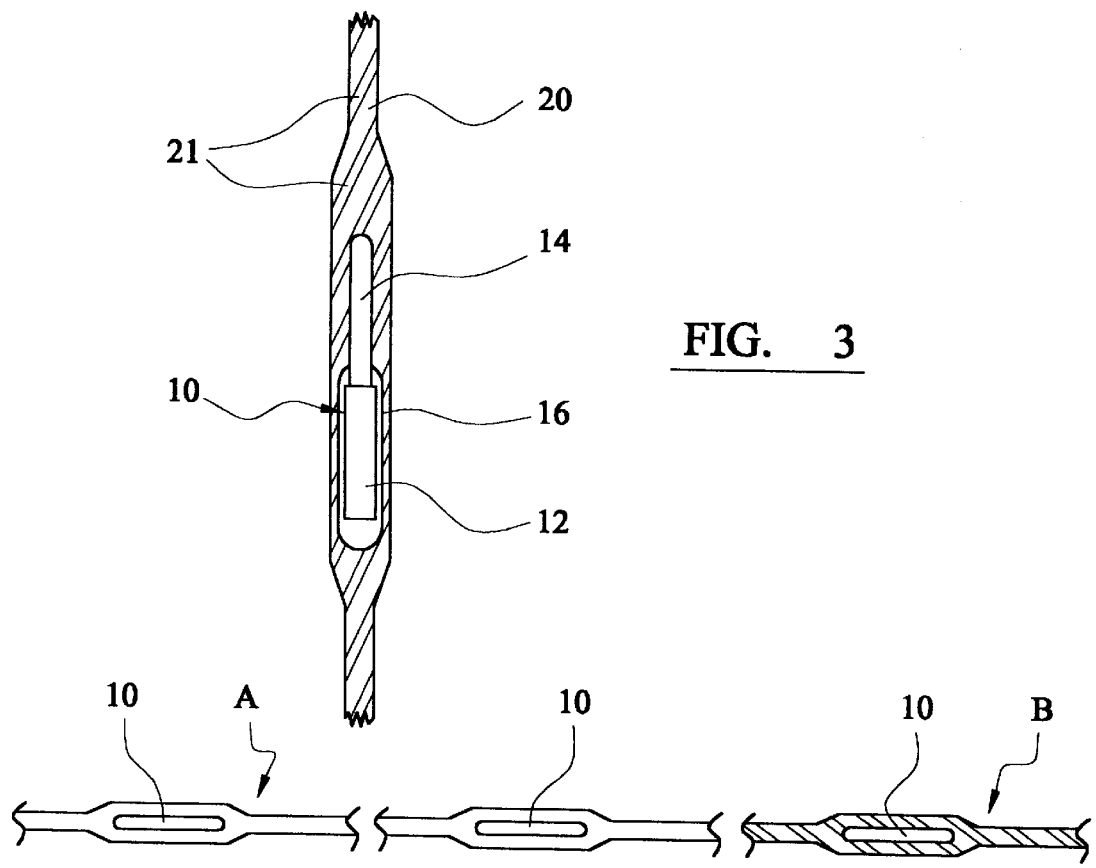
FIG. 3
FIG. 4
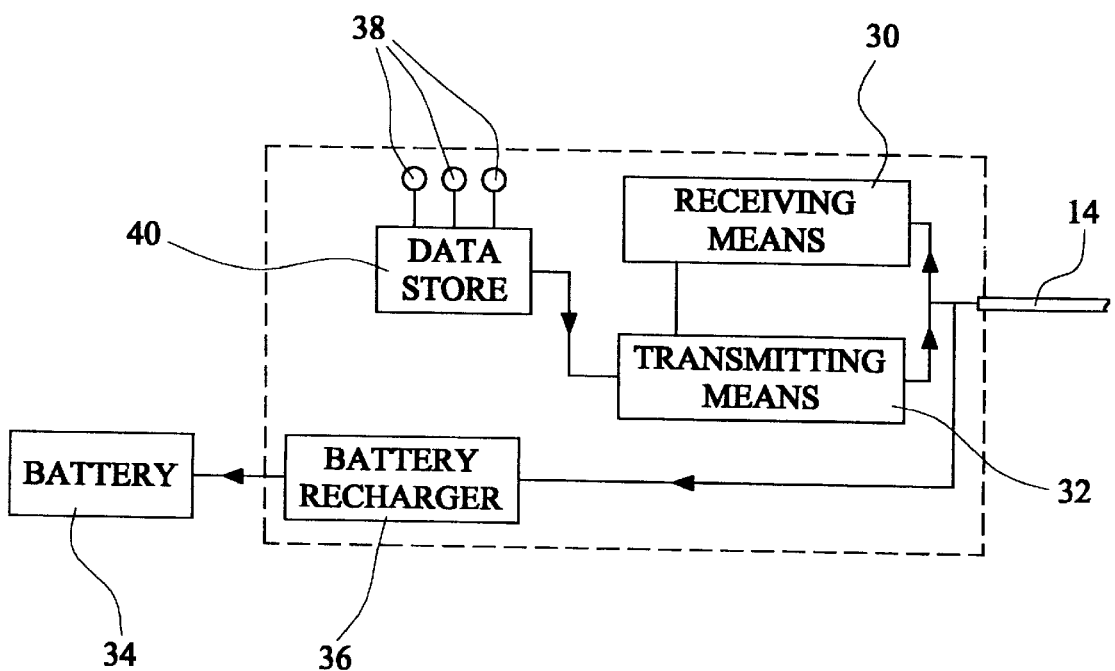
FIG. 5

IDENTIFICATION OR CONTROL ARRANGEMENTS

FIELD OF THE INVENTION

The present invention relates to identification or control arrangements, including arrangements enabling the movements of individuals or articles to be tracked, or the access of individuals to restricted areas or premises to be controlled.

STATE OF THE ART

There are many situations in which it is desirable or necessary to be able to track the movements of individuals. There are many situations also where it is desirable or necessary to control the access of individuals to restricted areas or premises. It is known to provide individuals with electronic transponders (or tags), or with magnetically-encoded cards, which are "read" by interrogation units in order to identify each individual. Generally these require the individual to remember to carry his or her transponder or card, and the systems are therefore compromised if the individual loses or misplaces his transponder or card, or has it stolen.

SUMMARY OF THE INVENTION

I have now devised arrangements which can be used to overcome the above-described problems and in particular can be used to provide individuals, and a wide variety of articles, with an identifier which is difficult if not impossible to perceive, at least visually. The arrangements can also be used in many situations where previous arrangements have been unsuitable.

In accordance with the present invention, there is provided a fibre or thread which incorporates an electronic transponder.

Also in accordance with the present invention, there is provided a fabric or other article having at least one fibre or thread which incorporates an electronic transponder.

The electronic transponder may be embedded or encapsulated within a unitary fibre. Alternatively, the fibre may comprise a plurality of filaments stranded together and enclosing the transponder. The fibre may include a plurality of transponders spaced apart along its length.

Preferably the electronic transponder is elongate in shape and of such a diameter (or other cross-sectional size) that it does not substantially increase the diameter of the fibre in which it is incorporated. In this manner, the presence of the transponder within the fibre, or its position within the fibre, is difficult or impossible to discern either visually or by touch.

The electronic transponder may comprise an integrated circuit having an aerial extending therefrom or incorporated therein. The transponder may include a battery power source: the transponder may be arranged so that an interrogation unit, with which it is to be used, will inductively couple power into the circuit via the aerial of the transponder in order to recharge the battery; instead, this inductive coupling may be used to power the transponder, in which case the battery power source is not required. In either of the latter cases, relative movement between the transponder and the interrogation unit may cause the necessary current to be generated and supplied to the transponder.

Preferably the transponder (except possibly its aerial) is wholly contained or encapsulated within a protective enclosure, for example of glass or ceramic material.

It will be appreciated that the transponder may be arranged, when interrogated by the interrogation unit, to transmit a reply signal which identifies the transponder, and therefore the fabric or other article having the fibre, or the individual wearing a garment or article, which incorporates the fibre. The movement of individuals wearing such a garment may be monitored, for example for the purpose of tracking individuals or for the purpose of limiting access to restricted areas or premises: alternatively, the transponder may be used to identify the fabric, garment or other article so that its movements can be monitored for security or stock control purposes, whether in the factory, or in a warehouse or the like, or in a retail outlet. The transponder may be arranged for interrogation by means of an electromagnetic signal of one frequency, and to transmit an electromagnetic reply signal of a different frequency, for example an optical signal.

The transponder may include one or more sensors, e.g. microphones, thermometers, accelerometers, hygrometers, light sensors, pressure sensors, direction-finding sensors, to sense and measure respective parameters: the measured values may be stored and the transponder arranged to transmit a signal representing the measured parameter.

It is also envisaged, in the manufacture of a fibre for a fabric of the invention, or in the manufacture of the fabric or of an article from the fabric, that data may be recorded in the transponder, this data representing information relating to the process or process conditions. For example, this information may include the date and time at which the processing took place, and the temperature or other processing parameters: in the latter case, where the fibre or fabric incorporates a transponder having a sensor (as mentioned above), the sensor may be arranged to sense and store the temperature or other processing parameter.

Whilst the fibres of the present invention may be combined with other fibres to form a fabric, they may be otherwise incorporated into an article. For example, the fibres or threads of the invention may be incorporated into stitching or the seams of fabrics or garments or of other articles, e.g. footwear, curtains, furniture etc. As further examples, the fibres or threads may be incorporated into articles used for wrapping, tying or reinforcing other articles.

In all of the above-described embodiments, it will be appreciated that an individual will automatically become identifiable, by appropriate interrogation units, upon donning an encoded garment or other article: the transponders which are incorporated in the fibres of the garment are difficult or impossible to perceive, at least visually. In some cases it will be necessary to position the transponder-containing part of the garment or other article in contact or close proximity to a reading head of the interrogation unit: however, in many cases this should not be necessary and in those cases the interrogation unit may be mounted to one side of a doorway or passageway through which the wearer of the garment passes.

For the purposes of this specification, the term "fabric" includes fabrics which are formed by weaving or any other process. Also, the fibres or threads may be of natural or synthetic materials, or a combination of natural and synthetic materials.

An embodiment of the present invention will now be described by way of example only and with reference to the accompanying drawings.

BRIEF DESCRIPTION OF THE DRAWINGS

FIG. 3 is a diagrammatic longitudinal section, similar to FIG. 1, through a fibre which comprises a plurality of filaments together enclosing a transponder;

FIG. 4 is a schematic view of a fibre or thread in which a plurality of electronic transponders are embedded, spaced apart along its length; and FIG. 5 is a block diagram of an electronic transponder used in the fibres or threads of FIGS. 1 to 4.

DETAILED DESCRIPTION OF THE PREFERRED EMBODIMENT

Figure 1:
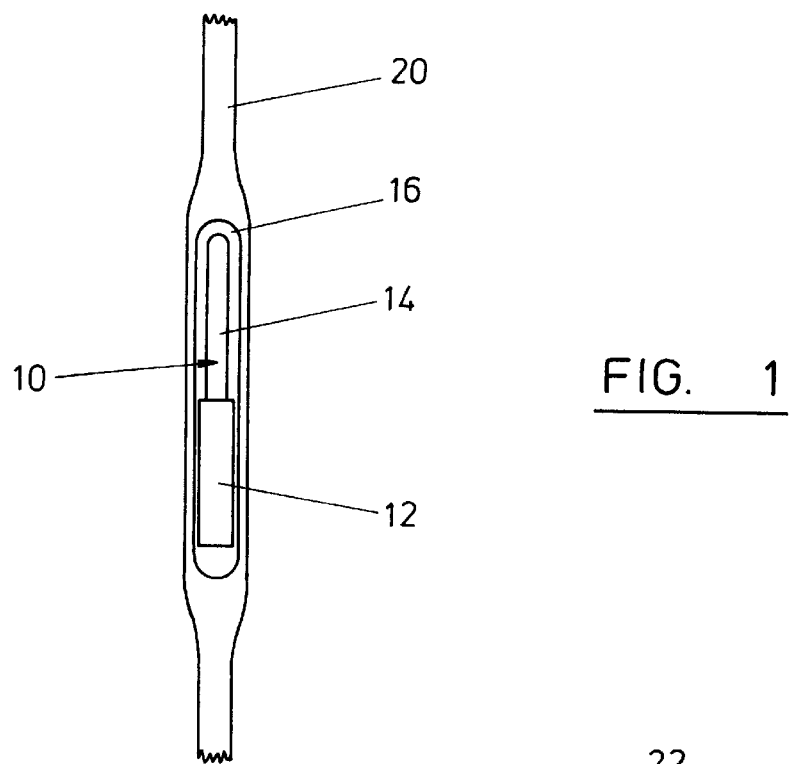
FIG. 1 is a diagrammatic longitudinal section through a fibre which incorporates a transponder.

Referring to FIG. 1 of the drawings, there is shown a miniature transponder 10 incorporated within a fibre 20 which, together with other fibres, is to be used to form a fabric. The transponder 10 comprises an integrated circuit 12 and an aerial 14, all encapsulated in e.g. glass or ceramic material (indicated at 16): the aerial 14 may however comprise an elongate filament extending from the transponder and incorporated in the respective fibre 20. The encapsulated transponder 10 is of elongate, preferably cylindrical shape and of a cross-sectional size preferably less than the diameter of the fibre itself, so that the overall diameter of the fibre is not enlarged (or not significantly enlarged) at the location of the transponder. The presence of the transponder is therefore difficult or impossible to discern either visually or by touch.

Figure 2:
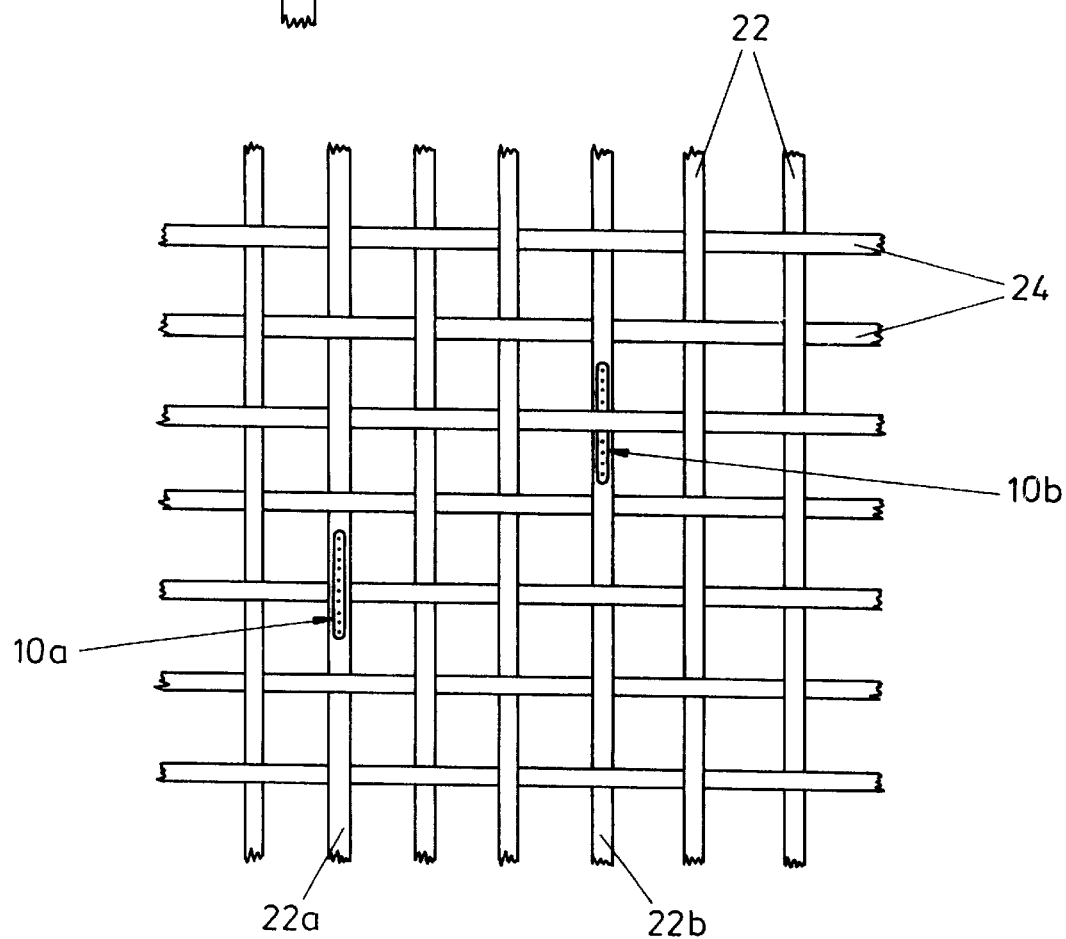
FIG. 2 is a schematic diagram illustrating a portion of a piece of fabric which includes some fibres as shown in FIG. 1.

Referring to FIG. 2 of the drawings, there is shown a portion of fabric which comprises fibres or threads 22, 24 woven together. The fibres 22 and 24 may be of any natural or synthetic material. Some of the fibres, e.g. fibres 22a, 22b, are fibres of the type shown in FIG. 1 and incorporate respective transponders 10a, 10b. Alternatively, each of theft fibres 22, 24 may comprise a plurality of filaments stranded together, one or more of the filaments incorporating a transponder. In general, one or more (or even all) of the fibres may include a transponder. One or more fibres may include a number of transponders spaced apart along its length.

FIG. 3 shows a fibre or thread 20 which comprises a plurality of filaments 21 stranded together and enclosing an electronic transponder 10. In this case, the transponder is shown encapsulated, except for its aerial 14, in protective material 16.

As shown in FIG. 4, the fibre or thread of the present invention may have a plurality of electronic transponders 10 embedded in it and spaced apart along its length. The fibre or thread may be of unitary form (as shown at A) or comprise a plurality of filaments 21 stranded together (as shown at B).

Referring to FIG. 5, the integrated circuit of the transponder includes receiving means 30 and transmitting means 32 connected to the aerial 14: in the event that an electromagnetic interrogation signal is received via the aerial, the receiving means 30 responds to this and causes the transmitting means 32 to transmit an electromagnetic reply signal, via the aerial, identifying the transponder. The reply signal is transmitted at a different frequency from the interrogation signal. The transponder includes a battery power source 34. The battery 34 may comprise a rechargeable battery, in which case a recharging means 36 is provided: electrical power is inductively coupled into the recharging means 36 via the aerial 14, for recharging the battery 34. The electronic transducer further comprises a number of sensors 38 (e.g. thermometers, light sensors, pressure sensors) for measuring respective parameters, and a data store 40 for storing data representing the respective measured values. The receiving means 30 responds to a received interrogation signal to cause the transmitting means 32 to transmit a signal representing the measured values stored in the data store 40.

It will be appreciated that when garments, formed at least in part of a fabric as described above, are worn, then the individual wearers of those garments can be identified by appropriate interrogation units. In this way, the movements of the individuals can be tracked and/or the access by individuals to restricted areas or premises can be controlled.

Further, the fabric itself (and garments or other articles made from or incorporating a fibre as shown in FIG. 1) can be identified, such that their movements e.g. within a manufacturing plant, warehouse or retail outlet, can be monitored, for the purposes of security and/or stock control. Although reference had been made particularly to garments made from the fabric, the principles of the invention are applicable to other articles of fabric, particularly where the identification of the fabric or article is for security or stock control purposes. For example, the fabric may comprise part only of an article, e.g. the woven backing of a carpet, mat or tapestry.

Also, as previously mentioned, the fibres or threads of this invention may be incorporated into stitching or the seams of fabrics or garments or of other articles, e.g. footwear, curtains, furniture etc. The fibres or threads may also be incorporated into articles used for wrapping, tying or reinforcing other articles.

What is claimed is:

1. A textile fibre or textile thread in which at least one electronic transponder is embedded, said electronic transponder comprising an aerial adapted to receive an electromagnetic interrogation signal, and an integrated circuit adapted to respond to said interrogation signal and transmit an electromagnetic reply signal via said aerial, said reply identifying said transponder.

2. A fibre or thread as claimed in claim 1, which is of unitary form.

3. A fibre or thread as claimed in claim 1, comprising a plurality of filaments stranded together and enclosing said electronic transponder.

4. A fibre or thread as claimed in claim 1, which comprises a plurality of said electronic transponders spaced apart along its length.

5. A fibre or thread as claimed in claim 1, in which said electronic transponder is elongate in shape and of such a cross-sectional size that the diameter of the fibre or thread is not substantially increased at the location of said transponder.

6. A fibre or thread as claimed in claim 1, in which said electronic transponder includes a battery power source.

7. A fibre or thread as claimed in claim 1, in which said electronic transponder includes a rechargeable battery, means for recharging said battery, and means for inductively coupling electrical power into said recharging means, for recharging said battery.

8. A fibre or thread as claimed in claim 1, comprising a body of protective material encapsulating said electronic transponder, including said aerial thereof.

9. A fibre or thread as claimed in claim 1, wherein said electromagnetic interrogation signal is at a first frequency, and said electromagnetic reply signal is at a second frequency different than said first frequency.

10. A fibre or thread as claimed in claim 1, in which said electronic transponder includes at least one sensor for measuring a respective parameter, said transponder being arranged to transmit a signal representing the measured value of said parameter.

11. A fibre or thread as claimed in claim 10, in which said electronic transponder comprises means for storing data representing said measured value and means responsive to said interrogation signal for transmitting said signal representing said measured value of said parameter.

12. A fibre or thread as claimed in claim 1, comprising a body of protective material encapsulating said electronic transponder, except said aerial thereof.

13. A fabric article constructed from textile fibres or threads, at least one of said textile fibres or threads having at least one electronic transponder embedded, said electronic transponder comprising an aerial adapted to receive an electromagnetic interrogation signal, and an integrated circuit adapted to respond to said interrogation signal and transmit a reply signal via said aerial, said reply signal identifying said transponder.

14. A fibre or thread which comprises a plurality of filaments stranded together, and at least one electronic transponder which is enclosed by said plurality of filaments and thereby embedded in said fibre or thread.

15. A fibre or thread as claimed in claim 14, comprising a plurality of said electronic transponders spaced apart along its length.

16. A fibre or thread in which at least one electronic transponder is embedded, said electronic transponder including a battery power source.

17. A fibre or thread in which at least one electronic transponder is embedded, said electronic transponder including a rechargeable battery, means for recharging said battery, and means for inductively coupling electrical power into said recharging means, for recharging said battery.

18. A fibre or thread in which at least one electronic transponder is embedded, said electronic transponder including at least one sensor for measuring a respective parameter and being arranged to transmit a signal representing the measured value of said parameter.

19. A fibre or thread as claimed in claim 18, in which said electronic transponder comprises means for storing data representing said measured value and means responsive to a received enquiry signal to transmit said signal representing said measured value.

* * * * *